US012579522B2

(12) United States Patent
Bell et al.

(10) Patent No.: US 12,579,522 B2
(45) Date of Patent: *Mar. 17, 2026

(54) CHANNEL AGNOSTIC SCHEDULING SYSTEM

(71) Applicant: Get Together AI, Inc., Cincinnati, OH (US)

(72) Inventors: Michael Bell, Cincinnati, OH (US); Madison A. Bell, Cincinnati, OH (US); Wen Ding, Sunnyvale, CA (US)

(73) Assignee: Get Together AI, Inc., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/611,956

(22) Filed: Mar. 21, 2024

(65) Prior Publication Data

US 2024/0233044 A1     Jul. 11, 2024

Related U.S. Application Data

(63) Continuation of application No. 18/092,903, filed on Jan. 3, 2023, now Pat. No. 11,966,987, which is a continuation of application No. 17/710,440, filed on Mar. 31, 2022, now Pat. No. 11,544,800.

(60) Provisional application No. 63/224,230, filed on Jul. 21, 2021.

(51) Int. Cl.
| | |
|---|---|
| *G06F 15/16* | (2006.01) |
| *G06F 40/289* | (2020.01) |
| *G06Q 50/00* | (2012.01) |
| *H04L 51/04* | (2022.01) |
| *G06Q 10/1093* | (2023.01) |

(52) U.S. Cl.
CPC ........... G06Q 50/01 (2013.01); G06F 40/289 (2020.01); H04L 51/04 (2013.01); *G06Q 10/1093* (2013.01)

(58) Field of Classification Search
CPC .. G06Q 50/01; G06Q 10/1095; G06F 40/289; G06F 40/186; G06F 40/284; G06F 40/30; H04L 51/04; H04L 12/1818; H04L 12/1881
See application file for complete search history.

(56) References Cited

U.S. PATENT DOCUMENTS

| | | | | |
|---|---|---|---|---|
| 11,544,800 B1 * | 1/2023 | Bell | .......................... | G06F 40/30 |
| 11,615,467 B2 * | 3/2023 | Thomas | ............. | G06Q 30/0251 |
| | | | | 705/38 |
| 11,966,987 B2 * | 4/2024 | Bell | .......................... | H04L 51/04 |

(Continued)

*Primary Examiner* — John B Walsh

(57) ABSTRACT

A system that allows for channel and platform agnostic automated scheduling. A user that is registered with the system may add an automated assistant into a pre-existing communication thread or channel, such as a short messaging service ("SMS") conversation between multiple friends. Any user in the thread may interact with the assistant even if not registered with the system. Once present, the assistant analyzes messages sent to the thread for wake words that trigger actions or responses by the system, including automated scheduling actions. When scheduling is invoked, the system will find acceptable times based on top-down and bottom-up availability provided by registered users, and will propose meeting times until one is accepted by some or all of the participants. Once accepted, the system will confirm the meeting, update linked calendars, and provide reminders to attendees.

17 Claims, 11 Drawing Sheets

(56)     References Cited

U.S. PATENT DOCUMENTS

| | | | |
|---|---|---|---|
| 2008/0066080 A1* | 3/2008 | Campbell | ............. G06F 16/958 |
| | | | 719/314 |
| 2010/0318398 A1* | 12/2010 | Brun | .................... G06Q 10/109 |
| | | | 705/7.18 |
| 2016/0342955 A1* | 11/2016 | Brock | ..................... H04L 67/02 |
| 2019/0005024 A1* | 1/2019 | Somech | .................. H04L 67/14 |

* cited by examiner

800

| Tap to Cycle | FREE ✔ | BUSY ✘ | MAYBE ? |
|---|---|---|---|

| | S | M | T | W | T | F | S |
|---|---|---|---|---|---|---|---|
| 06:00 | ? | ✔ | ✔ | ✔ | ? | ✔ | ✔ |
| 07:00 | ? | ✔ | ✔ | ? | ? | ✔ | ✔ |
| 08:00 | ? | ✘ | ✘ | ✘ | ? | ✘ | ✔ |
| 09:00 | ? | ✘ | ✘ | ✘ | ? | ✘ | ✔ |
| 10:00 | ✘ | ✘ | ✘ | ✘ | ? | ✘ | ✔ |
| 11:00 | ✘ | ✔ | ✔ | ✔ | ? | ✔ | ✔ |
| 12:00 | ✘ | ✔ | ✔ | ✔ | ✘ | ✔ | ✔ |
| 13:00 | ✘ | ✔ | ✔ | ✔ | ✘ | ✔ | ✔ |
| 14:00 | ✘ | ? | ? | ? | ✘ | ? | ? |
| 15:00 | ? | ? | ? | ? | ✘ | ? | ? |
| 16:00 | ? | ? | ? | ? | ? | ? | ? |
| 17:00 | ? | ✘ | ✘ | ✘ | ? | ✘ | ✘ |
| 18:00 | ? | ✔ | ✔ | ✔ | ? | ✔ | ✔ |

CHANNEL AGNOSTIC SCHEDULING SYSTEM

PRIORITY

This application is a continuation of U.S. patent application Ser. No. 18/092,903, filed on Jan. 3, 2023, which is a continuation of U.S. patent application Ser. No. 17/710,440, filed on Mar. 31, 2022, which was granted U.S. patent application Ser. No. 11,544,800 on Jan. 3, 2023, which claims the priority benefit of U.S. Provisional Patent App. No. 63/224,230, filed Jul. 21, 2021, and titled "Channel Agnostic Scheduling System," the entire disclosures of each are incorporated herein by reference.

FIELD

The disclosed technology pertains to a system for coordinating, communicating, and confirming scheduling in a platform and channel agnostic manner.

BACKGROUND

For many, it is difficult to find the time to meet with friends, family, and others, whether for leisure or to complete some specific task. Even when free time is available opportunities are missed due to forgetfulness, lack of communication or awareness of opportunities, or a desire to avoid the stress and aggravation that often comes with reaching out, confirming availability, selecting a meeting location, and arranging other details.

While various software platforms and other technologies provide tools or aids to promote or facilitate the process of scheduling a meeting, they often do not remedy the deficiencies that make scheduling an activity that is easier to avoid or put off to another day. Further still, many such platforms themselves have various barriers to use, such as requiring the installation of software applications to one or more devices, configuration of user accounts for each participant to the meeting, web browser requirements that must be met by each participant (e.g., unsupported browsers, inconsistent experience across browsers), and device requirements that must be met by each participant (e.g., unsupported mobile devices, inconsistent experience across mobile devices). Due to these deficiencies, avoidance of use of these conventional technologies becomes an additional barrier or reason to delay scheduling a meeting.

What is needed, therefore, is an improved system for communicating and confirming scheduling in a platform and channel agnostic manner.

BRIEF DESCRIPTION OF THE DRAWINGS

The drawings and detailed description that follow are intended to be merely illustrative and are not intended to limit the scope of the invention as contemplated by the inventors.

FIG. 9 is a screenshot of an exemplary interface usable with the system of FIG. 1 to provide scheduling preferences.

DETAILED DESCRIPTION

The inventors have conceived of novel technology that, for the purpose of illustration, is disclosed herein as applied in the context of automated, channel and platform agnostic, scheduling. While the disclosed applications of the inventors' technology satisfy a long-felt but unmet need in the art of automated scheduling, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

Figure 1:
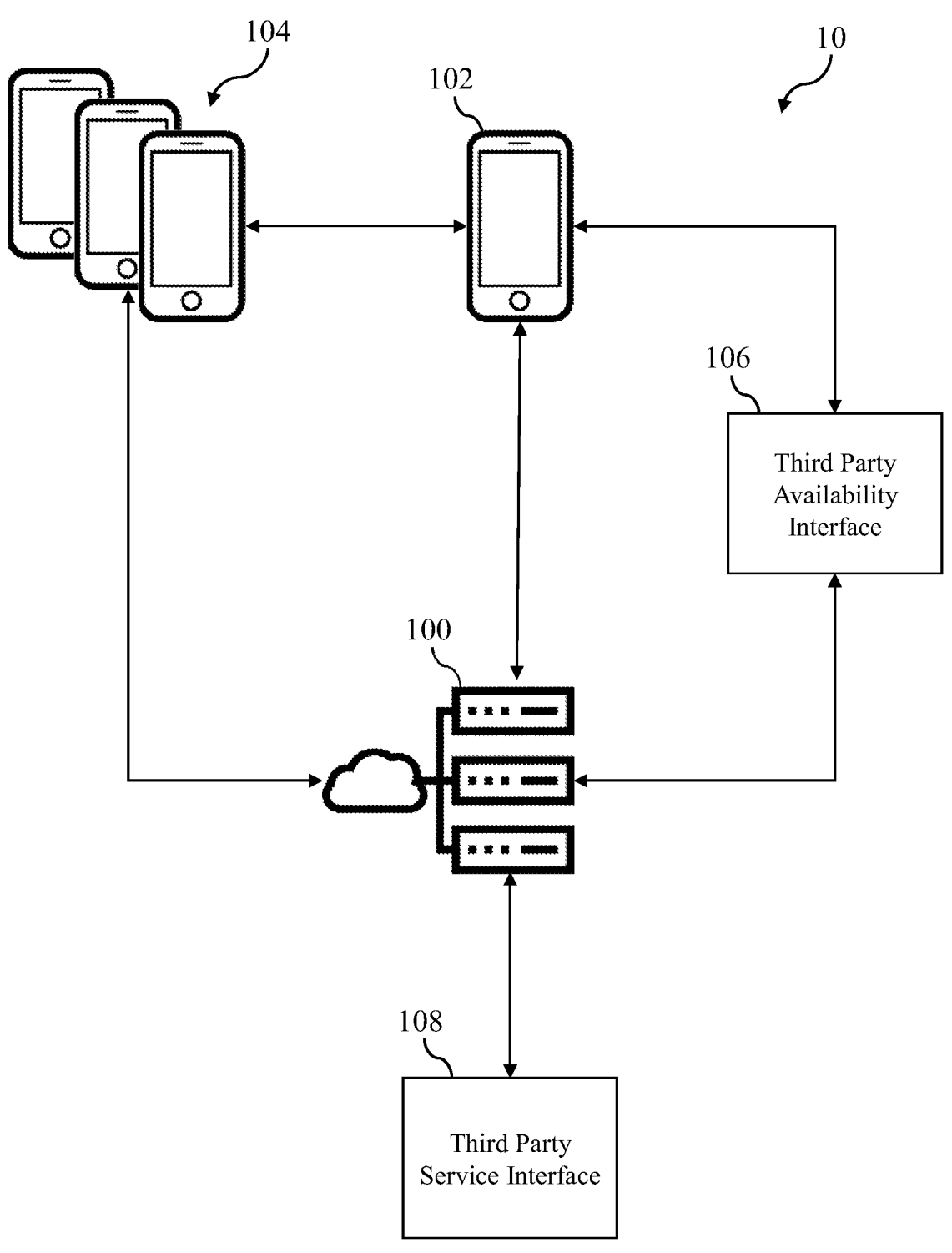
FIG. 1 is a schematic diagram of an exemplary system configured to manage communication and confirmation of scheduling in a platform and channel agnostic manner.

Turning now to the figures, FIG. 1 shows a schematic diagram of a system (10) configured to provide automated scheduling in a channel and platform agnostic manner. A scheduling server (100) may include one or more servers, including physical servers, cloud servers, virtual servers, or other computing environments, with each device of the server (100) having components such as processors, memories and other storage devices, network communication devices, and other components as may be required to receive, transmit, analyze, modify, and store information. The scheduling server (100) is in communication with a registered user device (102) that may be, for example, a personal computer, a mobile device such as a smartphone or tablet computer, or another computing device having a processor, memory, network communication device, and other components as may be necessary to receive, transmit, analyze, modify, and store information.

The scheduling server (100) may be in communication with the user device (102) through a direct API or other interface provided through a native software application, hybrid software application, or web browser interface configured on the user device (102), and may also be in communication through one or more third party communication channels or interfaces configured or otherwise usable by the user device (102) such as, for example, third party text messaging channels (e.g., including cellular or mobile data network based short message service or "SMS" channels), third party text, video, and audio chat channels, and other types of third party communication channels that allow two or more users to exchange text information via the internet, mobile data networks, local networks, or peer-to-peer (e.g., via Bluetooth, direct Wi-Fi, or other device-to-device communications). As further example, such communication channels may include individual or small group communication channels provided via a social media platform or technology platform (e.g., direct messaging, messengers, chats), may include messaging platforms with a business productivity focus or field of use (e.g., such as a messaging platform used primarily for professional internal communications between employees or collaborators within a particular company or small team), may include messaging platforms with wide usage driven by particular channel orientations (e.g., such as a messaging platform used for entertainment, personal activities, and professional activities, with channel specific sub-categorizations that may have a particular focus or mix of foci), and other communications channels.

The scheduling server (100) and user device (102) may also be in communication with one or more other user devices (104). While some of the other user devices (104) may be associated with registered users of the scheduling server (100), it is not a requirement, and in many cases the other user devices (104) will not registered on the scheduling server (100). In such cases, the scheduling server (100) and the user device (102) may be in communication with the other user devices (104) via third party communication channels as described above, including via SMS channels and other text communications channels, as will be described in more detail below. This advantageously allows for the other user devices (104) to interact with the scheduling server (100) and participate in the automated scheduling processes and features without needing to register with the scheduling server (100) or installing first party software from the scheduling server (100) or another software source as a pre-requisite.

The scheduling server (100) may also be in communication with one or more third party availability interfaces (106) or services, which may include local or cloud based calendars (e.g., a user may have one or calendars for professional uses or personal uses), local or cloud based task management, productivity, or planning tools, and other software tools and platforms that may describe, expressly or implicitly, the user's availability during subsequent time periods. As an example, a particular user may have a personal account with a software platform that provides email, calendar, messaging, task management, and other tools all linked to the same personal account, and may also have a professional account (e.g., through an employer or as part of their own business or consulting services) with some or all of the same features linked to that professional account. By providing the managing server (100) with account details, authentication, or other authorization for those personal and professional accounts, the managing server (100) may access relevant information from those accounts via the third party availability interfaces (106). In some implementations, requests to the availability interfaces (106) may originate directly from the scheduling server (100), while in others they may be routed through the user device (102), with the user device (102) receiving the requested information and then passing it along to the scheduling server (100).

The scheduling server may also be in communication with one or more third party service interfaces, which may include software interfaces or communication channels provided by third parties and usable to exchange information with those third parties. As an example, this could include a third party software interface that may receive requests to automatically reserve a table at a restaurant, or send a rideshare driver to a particular location for a particular user. As another example, this may include text based interfaces that allow for requests or information to be provided as free-form text, such as a text-based request to reserve a table, or contact a particular user by phone to facilitate reservation of a table. The scheduling server (100) may interact with service interfaces (108) using information provided from the user device (102) during registration or subsequently (e.g., such as an account associated with a rideshare service that is linked to the user account at the time of registration), or may interact with the services interfaces (108) in a different manner.

FIGS. 2A through 2H illustrate a sequence of exemplary user interfaces and interactions with a system such as that of FIG. 1. The interactions are illustrated as occurring via a mobile device (e.g., such as the user device (102)), and each occur through a native SMS application of the mobile device, though it should be understood that other communication channels and interfaces would also be suitable.

Figure 2A:
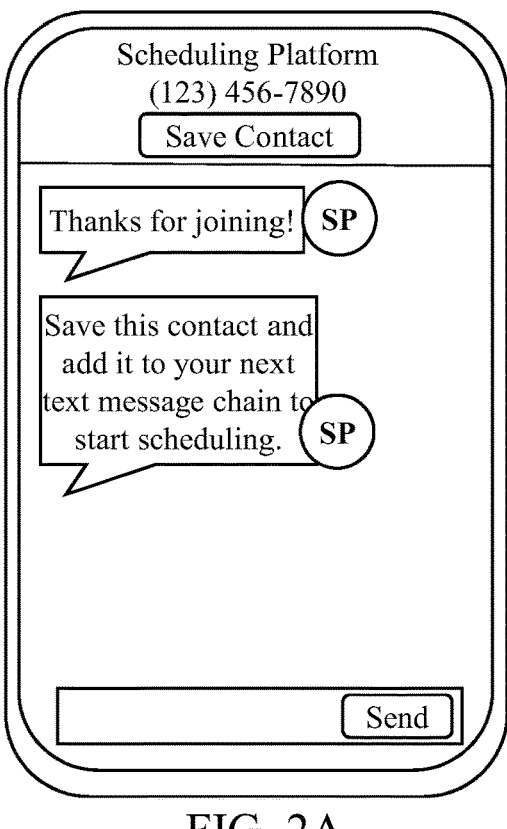
FIGS. 2A through 2H illustrate a sequence of exemplary user interfaces and interactions with the system of FIG. 1.

In FIG. 2A, just after registering with the scheduling server (100), the primary user "CD" receives a text message from Scheduling Platform, or "SP", instructing CD to save SP's information as a contact, and to add that contact to any SMS thread in which CD would like to invoke the features of the platform. Within the context of an SMS interaction, a contact or "contact card" is a data structure that describes the details of a particular contact (e.g., name, phone number, address, etc.). Contact cards may be saved, reviewed, updated, shared between parties, and added to multi-user SMS threads. In the context of other channels, the equivalent of a contact card may be an added or accepted "friend", "contact", "connection", or may be an automated bot, chatbot, or other automated participant, or may be another association with an account or user of a platform that provides that channel, and may be similarly saved, updated, removed, or added to certain communication threads, walls, or other venues within the platform that provides that channel.

Figure 2B:
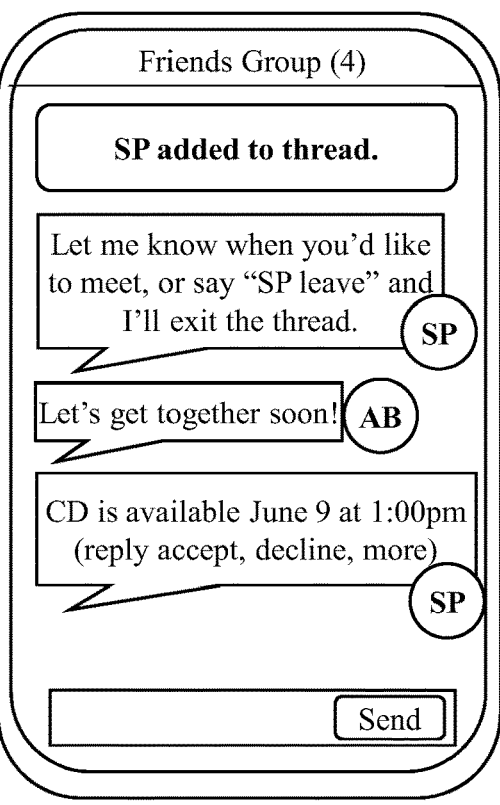

In FIG. 2B, user CD is now in a multi-party SMS thread with several of their contacts, and has just added the SP contact to the thread as a participant. Upon being added to the thread, the scheduling server (100) receives information indicating the addition of SP, and causes SP to automatically introduce the automated scheduling features to the thread. From this point on, the scheduling server (100) receives each message in the thread and is able to automatically respond to certain pre-defined wake words, or other context based message information that might trigger an automated response (e.g., as opposed to a pre-defined wake work, a "fuzzy wake word"). Another user, "AB", is part of the thread but has not registered with the scheduling server (100). In response to receiving an SMS from AB proposing to "get together soon," SP determines a potential meeting time based on scheduling information and preferences previously provided by CD, and proposes this time to the thread with instructions for response.

Figure 2C:
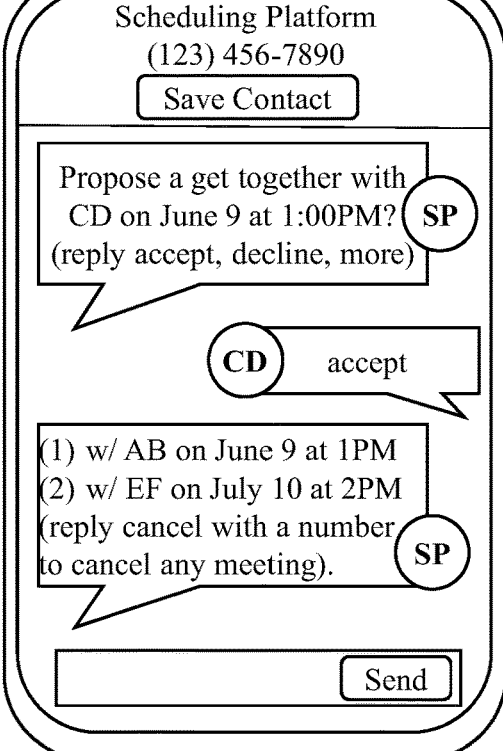

In FIG. 2C, prior to sending the proposed time, SP has sent a message to CD individually confirming that the determined potential meeting time should be shared with the entire thread. SP may provide other information to CD individually, such as summaries of their confirmed meeting times, and response options to automatically cancel or reschedule those meeting times (e.g., an SMS response of "cancel 1" would automatically cancel the recently schedule meeting with AB). It should be understood that some user accounts may be configured with the scheduling server (100) such that there is no confirmation prior to proposing a time to the entire thread. The system may communicate directly with the register user CD in other situations as well, such as pro-actively identifying opportunities to get together with other registered users that CD is connected to. As an example, this may include identifying a weekend in July where CD has no plans, and pro-actively proposing, directly to CD, a get together with AB or another friend during that weekend in July, which CD may initiate by a simple in-thread response to SP.

Figure 2D:
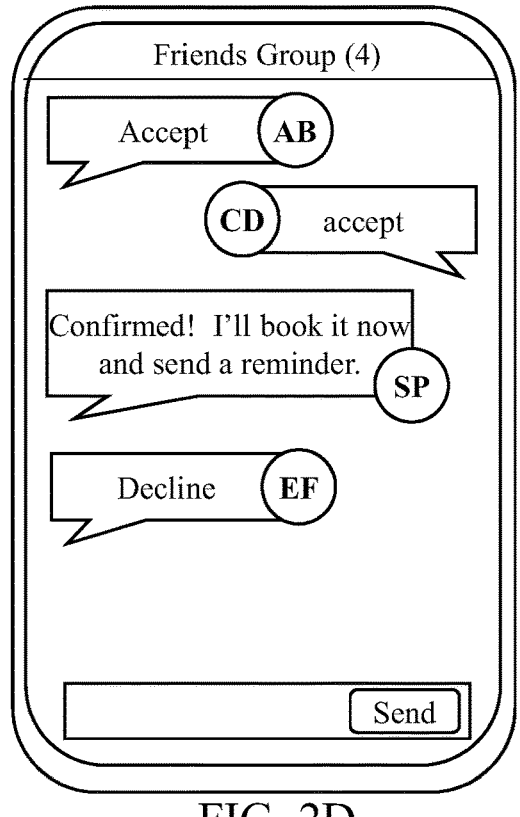

In FIG. 2D, each of AB and CD have replied and accepted the proposed time, prompting SP to confirm the scheduled get together. As will be discussed in more detail below, a number of server side activities are associated with a confirmation, including updating any third party availability services to reflect the scheduled time and configuring the future transmission of reminders to the attendees. A third participant in the conversation, "EF" has declined the invitation, and will not receive any subsequent reminders, or have any availability information automatically updated to the extent that they are registered with the scheduling server (100). Depending upon a particular implementation, as well as particular user preferences, conversation context, and other factors, the scheduling server (100) may require that each person on a thread accept the proposed time before confirming, or may immediately confirm after at least two participants have accepted, as illustrated in FIG. 2D. Similarly, depending upon a particular implementation and context, later refusals of the invitation may cause the system to propose additional times until each party accepts, or may cause an automated prompt or reminder to be provided to CD in the following days or weeks to attempt to schedule another meeting with EF.

Figure 2E:
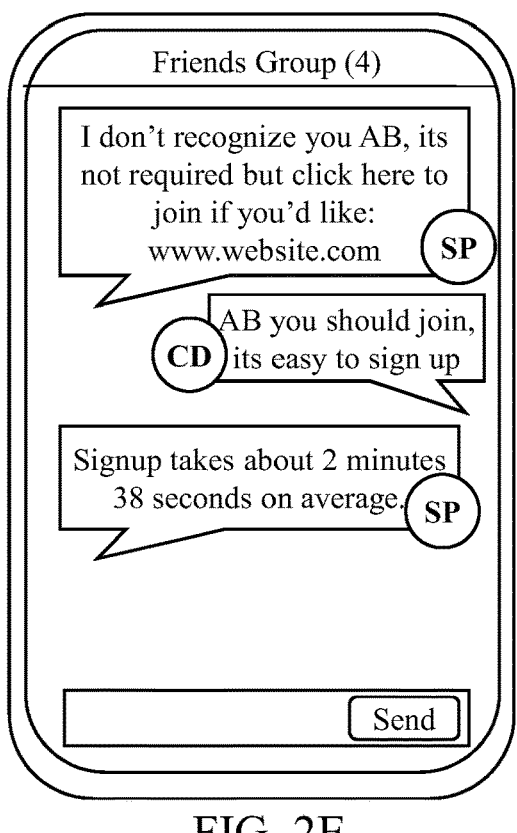

In FIG. 2E, the management server (100) prompts AB to register with the system in response to identifying AB as an unregistered user. CD also suggests that AB register, and in response to recognizing the context of the message as on relating to the ease at which AB can register (e.g., a "fuzzy wake word" scenario), the scheduling server (100) causes SP to reply with information about the average time that it has taken recent users to complete registration with the platform. While AB may choose to register with the platform at this point, it is not required, and FIGS. 2F-2H assume that AB has not registered.

Figure 2F:
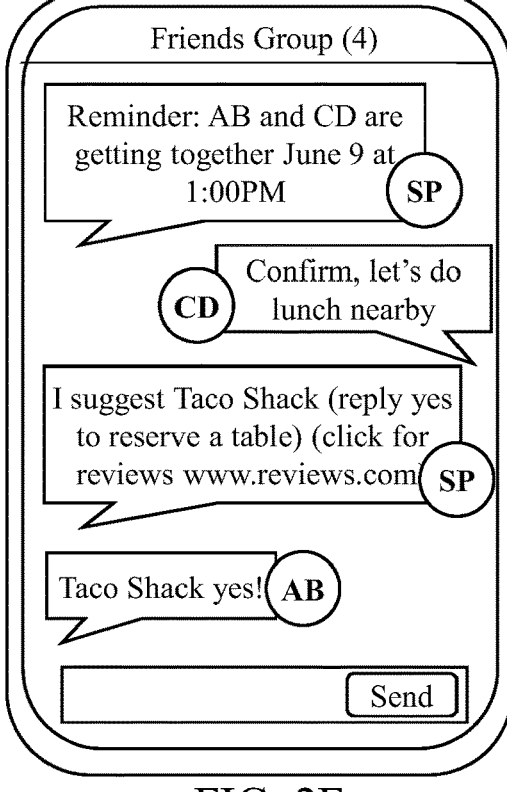

In FIG. 2F, some period of time has elapsed and SP automatically provides a reminder of the scheduled get together. Depending upon particular implementations and user configurations, reminders may be provided at varying times (e.g., once a week, 72 hours prior to meeting, 24 hours prior to meeting, etc.). In response to CD's message mentioning "lunch nearby," SP suggests a potential meeting place along with instructions for confirming or reserving a table. On the server side, the management server (100) has analyzed the message context and identified "lunch" and "nearby" as relating to the meeting. As a registered user, the management server (100) has access to CD's registered location (e.g., or real time location as determined by a GPS signal or other location service and provided via a native software application on CD's user device), and may also have access to CD's configured or historic preferences for lunch locations. Using this information, as well as information on restaurant locations and hours (e.g., as may be available via a third party map service or API), the management server (100) has identified a suitable lunch location to propose.

Figure 2G:
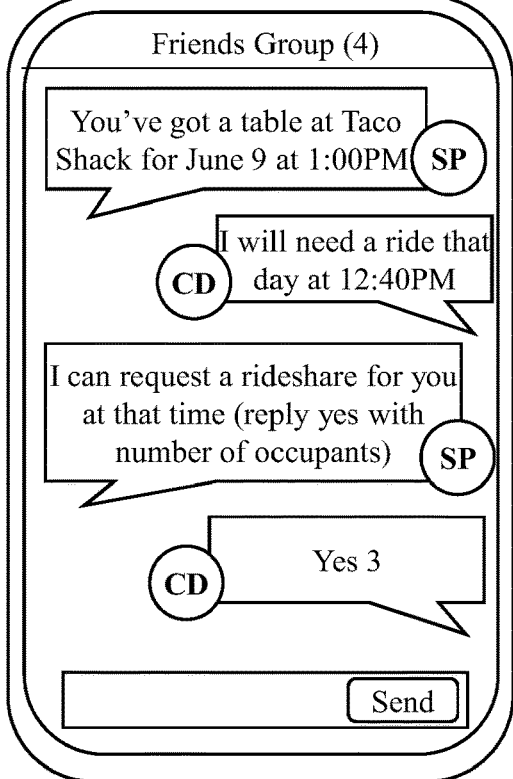

AB then responds in the affirmative, causing the management server (100) to reserve and confirm the reservation as shown in FIG. 2G. On the server side, this may include a request from the management server (100) to the restaurant via a third party services interface (108). The management server (100) responds similarly to CD's request for a ride, which also may include a request via a third party services interface (108) to schedule and confirm CD's pickup time and number of passengers.

Figure 2H:
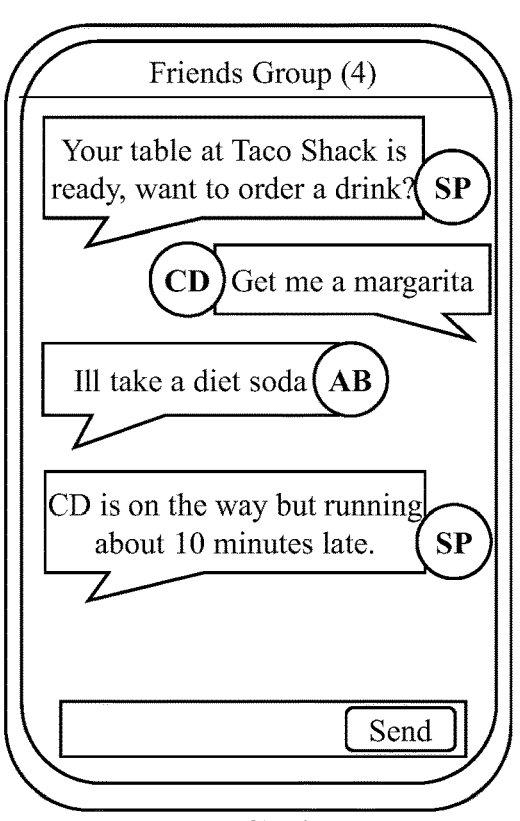

In FIG. 2H, just before the meeting time, SP responds to let AB and CD know that their table is ready and that there is no anticipated reason why the meeting will not proceed as scheduled. This response may be based upon information received from the restaurant via a third party services interface (108), or may be a generic message used in the absence of information from the restaurant. In some implementations and for some restaurants, AB and CD may also be able to begin placing orders for food or drink from the restaurant, which may be interpreted by the management server (100) and provided to the restaurant via the third party services interface (108). Finally, in response to determining that CD is running a little late, SP provides a message letting CD know of their status. This response may be based upon a manual action by CD indicating their tardiness, or may be fully automated and may be based upon CD's real-time location as provided by their user device.

Figure 3:
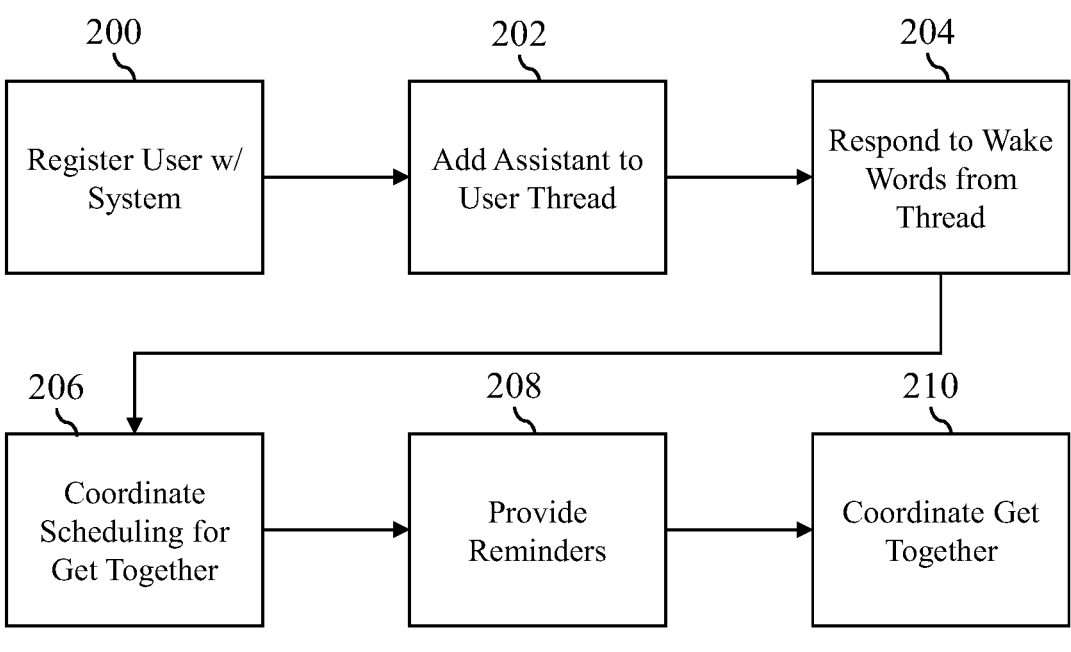
FIG. 3 is a flowchart of an exemplary set of high-level steps that could be performed with the system of FIG. 1 to provide automated scheduling.

While the user facing use case illustrated by FIGS. 2A through 2H above is instructive of many of the features, uses, and advantages of the disclosed technology, FIGS. 3-8 provide additional information and examples of the configurations and steps performed by a server such as the management server (100) to provide this user experience. As an example, FIG. 3 is a flowchart of an exemplary set of high-level steps that could be performed with a system, such as the system (10) of FIG. 1, to provide automated scheduling. The system may register (200) a user, which may include a user providing information via a browser based interface or via a native software application, in order to create an account for the user, and determine configurations and meeting preferences. Typically this information will include at least an identification of the channel(s) over which the user would like to engage with the system so that the system may send an SMS message and contact card, or a friend or connection request, as may be applicable for that channel.

The system may then add (202) a scheduling assistant (e.g., such as SP from the example of FIGS. 2A-2H) to that user's pre-existing communication threads on the configured channels in response to the user's request. Addition (202) of the assistant may be in response to an invitation, invocation (e.g., such as adding the contact card), or other quest from the user or another participant in the thread, or may be in response to a manual user action via a software application configured on the user's device. As an example, where the user wishes to add (202) the assistant to a thread with one or more thread specific configurations or restrictions, the user may make such selections via a separate software application so that the assistant (202) will subsequently join the thread with a thread-specific state. This state may be communicated via the software application, or the software application may generate a custom wake word (e.g., an encoded string that contains the thread-specific configurations) that may be used in the thread to cause the assistant (202) to take on that configured state.

Once added (202), the assistant may monitor for and respond (204) to wake words used in the thread, including any pre-defined wake words, as well as any context based free form wake words (e.g., "fuzz wake words"). Where the system detects any wake words of either type related to scheduling a get together between thread participants, the assistant will provide specific responses and take specific actions (206) to facilitate scheduling and confirmation of the get together between the parties. Once scheduled, the assistant will remain in the thread to provide (208) reminders related to the get together, and may further coordinate (210) execution of the get together by responding to requests relating to parking, transit, rescheduling, and cancelation.

Figure 4:
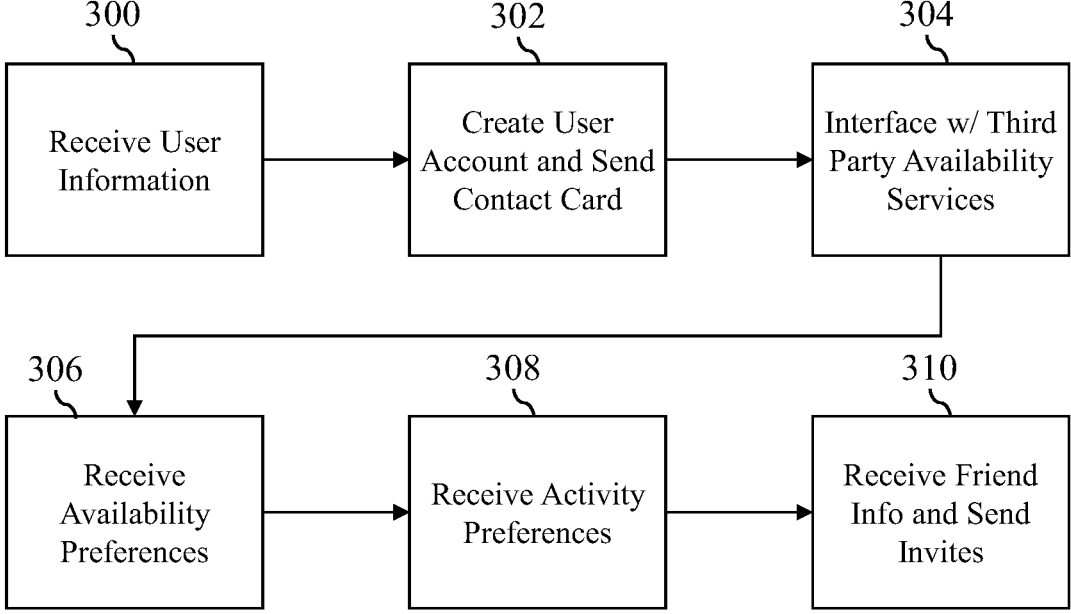
FIG. 4 is a flowchart of an exemplary set of steps that could be performed with the system of FIG. 1 to register users.

FIGS. 4-8 provide additional examples of configurations and steps performed with the system, some or all of which may be performed during the steps of FIG. 3. As an example, FIG. 4 is a flowchart of an exemplary set of steps that could be performed with the system to register users. A set of initial user information may be received (300), which will typically include at least an identification of a channel over which the user will interact with the system and scheduling assistant (e.g., such as a SMS channel). Other information received (300) may include the user's name, date of birth, address and other contact information, and in some cases payment information that may be used to provide the user certain premium features, or to provide for automated payment for interactions through the third party services interface (108). Based on this information, the system may create (302) and store an account for the registered user, and may send contact information to the user on the channels identified for communication, which may include sending an SMS message, contact card, and instruction for adding an assistant to a thread, or other appropriate information applicable to the identified channels.

During registration, the system may also receive authentication or authorization information relating to third party availability services, and may interface (304) with those services to verify access, store information relating to availability, or ensure the ability to write to or otherwise modify the user's availability on those services. In some implementations, interfacing (304) with third party availability services may include using information from those services as needed, but intentionally not retaining information from those services on the scheduling server (100) beyond the needed period of time. As an example, this may include requesting current availability when actively scheduling a meeting, and then discarding the received information once the meeting is scheduled. In this manner, the various third party availability services act as a distributed database for the scheduling server (100), reducing local storage requirements and increasing security for the user's information. Information gathered from the availability services may be used to establish the user's "bottom up" availability for future scheduling (e.g., unavailable times will generally be treated as "strictly unavailable"). The system may also prompt the user for, and receive (306), the user's "top-down" availability preferences (e.g., without specificity to any particular week, a general preference of the user towards meeting, against meeting, or ambivalent with respect to meeting).

FIG. 9 shows an example of an interface (800) that may be used to gather such "top-down" availability via a user device such as a smartphone, tablet, or other personal computing device. The interface (800) includes an indication of the days of a week or other time period and an indication of blocks of time within that time period, expressed by the columns (802) and rows (804) of the table. The user may tap, click, or otherwise interact with each cell to change the status from showing a preference towards availability at that time and day, a preference against availability at that time and day, or ambivalence. In addition to cycling each period, the user may provide further information or preference related to each cell, or grouping of cells, such as a preference towards a location, or activity for which they are available at that time. As an example with reference to FIG. 9, this may include selecting from drop down menus, radio buttons, or a set of checkboxes to indicate that the period of pro-availability on Saturday from 6 AM to 8 AM has a preference for health and fitness activities located near the user's residence, while the period of pro-availability on Saturday from 11 AM to 1 PM has a preference for lunch activities located within a 15 mile radius of the user's residence.

Returning to FIG. 4, the system may also receive (308) further activity preferences for the user, which may include the user selecting their favorite activities, favorite foods, favorite books or movies, and other preferences that may enable the system to pro-actively provide recommendations via the assistant. The system may also receive (310) contact information for one or more contacts of the newly registered user, and may send invitations to those contacts via the same preferred channels identified by the user. The form of such an invite will vary, but for example may include the friend being added to an SMS thread with the registered user and an assistant (e.g., similar to that shown in FIG. 2E), or may include the friend receiving an invitation to become friends with or connect to the assistant which identifies the recently registered user as a common connection.

Figure 5:
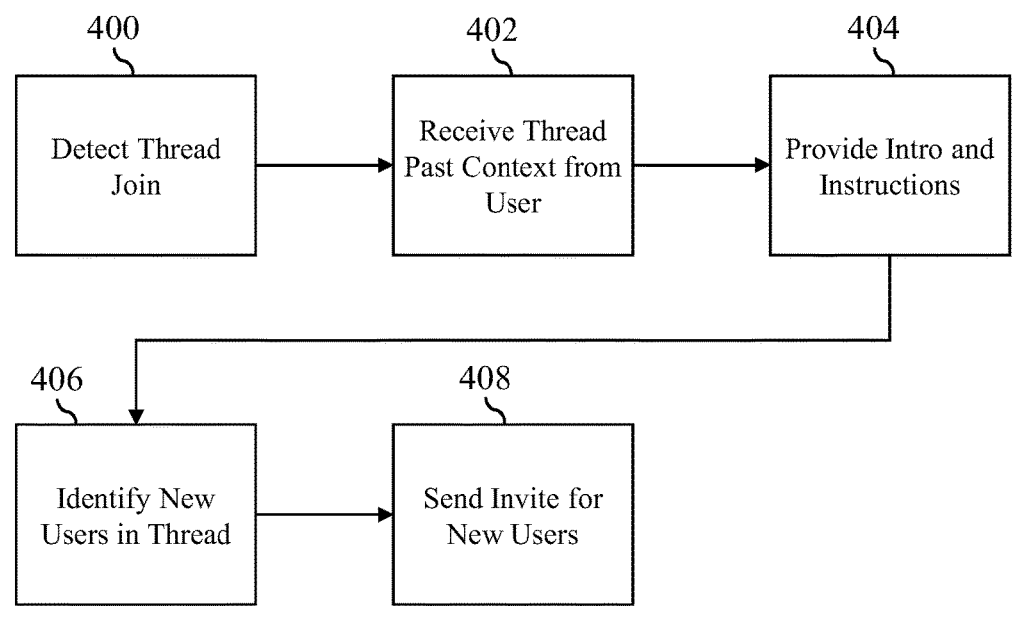
FIG. 5 is a flowchart of an exemplary set of steps that could be performed with the system of FIG. 1 to add automated scheduling to an existing communication channel.

As further example of configurations and steps performed with the system, FIG. 5 is a flowchart of an exemplary set of steps that could be performed with the system to add automated scheduling to an existing communication channel. After a user invokes (e.g., by adding the assistant as a contact, or otherwise) the assistant from a pre-existing communication thread, the system may detect (400) this invocation begin receiving and monitoring communications from the thread. Upon invocation, the system may also receive (402) additional context or state information describing the thread from the invoking user, which may include, for example, text or other information present in the thread prior to the assistant being added to the thread. Such information may be scraped from the thread by a software application configured on the user device of the invoking user, and may be submitted to the management server (100) for analysis of any recently used wake words. In this manner, the assistant may "join" the thread once invoked, and immediately respond to a historic wake word present in the thread. In some implementations, historic context within the thread may already be present and visible to the assistant upon joining, and so may be accessed directly.

The system may also provide (404) an introduction and instructions upon joining a thread, as illustrated in FIG. 2A. The system may also identify (406) or attempt to identify each other participant in the thread based upon available information (e.g., the user's phone number, username, or other uniquely identifying information), or may receive additional information from the registered user that invoked the assistant (e.g., the assistant may obtain another participant's phone number, and receive that participant's name or email address from contact information available to the invoking user and stored in an address book or contact card for the participant). Once each user in the thread is identified (406) to the extent possible, the system will be able to determine which participants are already registered with the management server (100), and which are unregistered participants. Such information may be used by the system when reacting to wake words, based upon a particular implementation and user configuration. For example, wake words that might reserve third party services (108) may only be addressed when originating from registered users. The system may additionally use such information to invite (408) unregistered users to join the platform, as illustrated in FIG. 2E.

Figure 6:
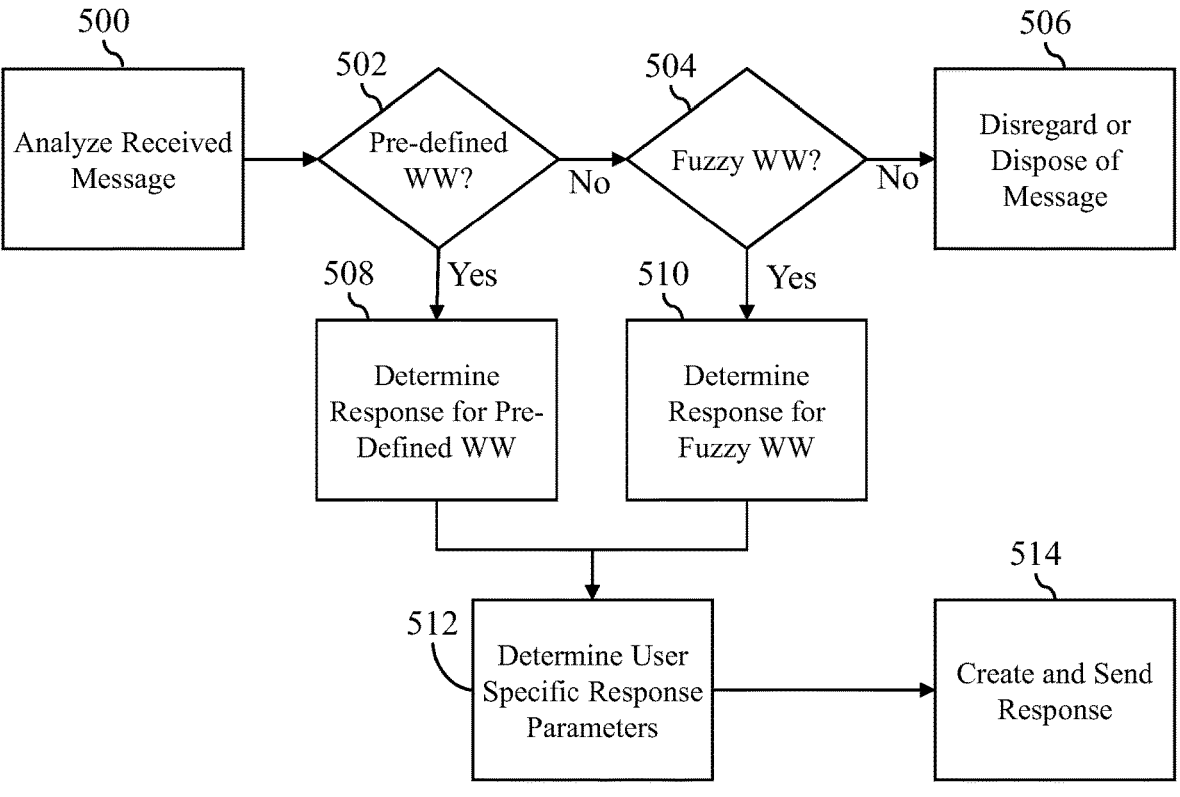
FIG. 6 is a flowchart of an exemplary set of steps that could be performed with the system of FIG. 1 to detect and respond to wake words.

As further example of configurations and steps performed with the system, FIG. 6 is a flowchart of an exemplary set of steps that could be performed with the system to detect and respond to wake words. As messages are sent by participants in a chat thread where the assistant is present, such as illustrated in FIGS. 2B, 2D, and elsewhere, the messages are received by the scheduling server (100) via the assistant (e.g., in the case of an SMS thread, received at a phone number associated with the assistant, wherein the scheduling server (100) is configured to receive the text content provided to the phone number). Received messages are analyzed (500) to identify any wake words that may trigger automated actions or other response from the assistant.

Where the analysis (500) identifies any pre-defined wake words (502), the system may determine (508) the appropriate response or action for that pre-defined wake work. Pre-defined wake words (502) may be configured as a dictionary or list of keywords that have a certain meaning within the context of the system, as well as some variations on those words (e.g., synonyms, common misspellings, other common messages that are received by users trying to invoke those wake words). Each pre-defined wake word may be associated with a certain pre-defined action or response, or may trigger the assistant to enter a certain action/response branch or path that include a number of responses or actions.

Where no pre-defined wake words are found (502), or in some implementations, regardless of whether any pre-defined wake words are found (502), the system may also identify and fuzzy wake words (504) or phrases within the received message, and determine (510) a response for the fuzzy wake word. As described above, a fuzzy wake word is a word or phrase that, by itself or within context of other parts of the message or prior messages, has a meaning similar enough to a pre-defined wake word that it is likely an attempt by the user to invoke the wake word, or that has a meaning that the system is otherwise able to flexibly determine and provide a response to. As an example, the system may have the phrase "get together" as a pre-defined wake word that should be used to explicitly trigger automated scheduling features (e.g., "Let's get together soon!"). Where a message is received such as "Let's meet together soon!" the system may be configured to identify that as a fuzzy wake word with similar effect due to the similar meaning and context.

As another example, a message may be received such as "who is SP?" from a user that is not registered to the system. Using semantic analysis and other context, the system may determine that the user is unfamiliar with the function of the assistant, and may repeat its initial introduction responses and instructions in response to that user. As with pre-determined wake words, responses for fuzzy wake words may be selected from a list of pre-determined responses, or may be determined dynamically based on semantic analysis.

Analysis (500) of the received words may be performed using an expert module, rule set, or artificial intelligence (e.g., machine learning or other process), and may be adapted and trained over time manually and automatically based on aggregate results of message analysis.

Where the system does not identify any pre-defined or fuzzy wake words (502, 504), or in some implementations, after completing analysis (500) of messages, the system may disregard and/or dispose of the message contents (506) rather than storing them on or accessible to the scheduling server (100). This may reduce the storage requirements of the system and improve security around user messages, and in instances where the system may need to access the message content again they may be received from a user device of a registered user where they are stored locally (e.g., another advantageous form of distributed storage).

After identifying one or several actions or responses (508, 510) based on analysis of the message, the system may also determine, for one or all registered users that are participants of the thread, whether there are any user specific response parameters or configurations. For example, one registered user configuration may prevent other participants in the thread from invoking actions by the assistant that may cause charges to be incurred by that registered user. In such a case, the system may determine (512) this response configuration, and may modify or limit further actions or responses based thereon. Continuing the example, this may include the assistant providing a message acknowledging a request from an unregistered user to obtain movie tickets for an upcoming show, and only completing the requested action once confirmation is received from the registered user who may incur charges for the movie tickets.

After determining (508, 510) and appropriately modifying (512) the responses to any wake words as may be needed, the system may create text for and send (514) the appropriate response to the participants of the thread, such as illustrated in FIGS. 2F-2H and elsewhere.

Figure 7:
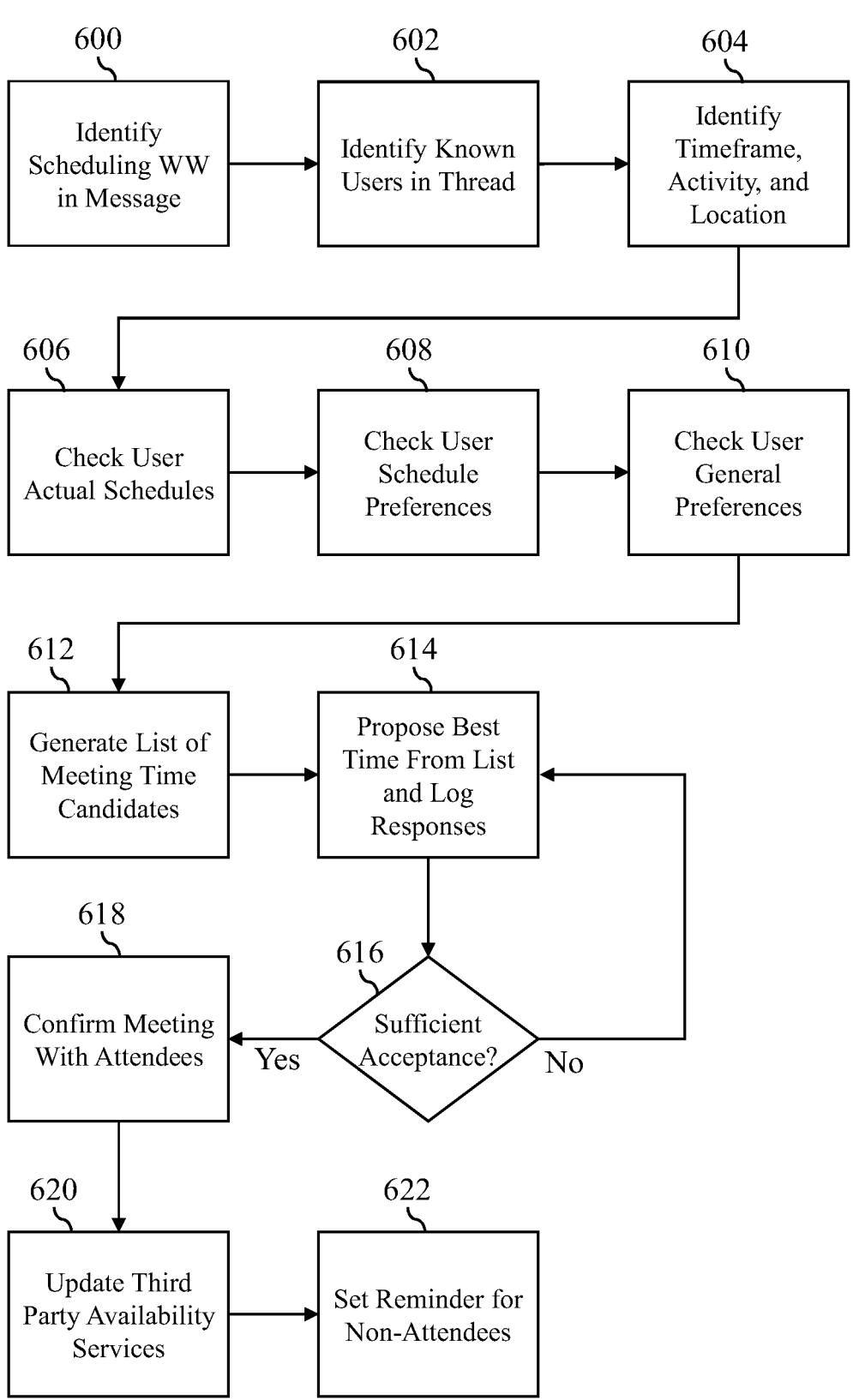
FIG. 7 is a flowchart of an exemplary set of steps that could be performed with the system of FIG. 1 to coordinate scheduling of an event.

As further example of configurations and steps performed with the system, FIG. 7 is a flowchart of an exemplary set of steps that could be performed with the system to coordinate scheduling of an event. Steps such as those shown in FIG. 7 may be performed in reaction to wake words relating to scheduling a get together between two or more participants in a communication thread. Where the system identifies (600) a wake word or phrase related to scheduling a meeting, the system may identify (602) all known registered users that are present in the thread, as these users may be sources of both top-down and bottom-up scheduling restrictions or preferences, as has been previously discussed.

The system may also perform further analysis of the triggering message, and in some implementations may also perform additional analysis (e.g., semantic or other language analysis) of preceding messages, in order to identify (604) additional details relating to the desired get together, which may include information suggesting a timeframe, activity, location, or other characteristics of the desired get together. As an example, words or phrases that the system may identify (604) as suggestive of a particular time frame might include "soon", "tomorrow", "next week", "end of the month", or others. Words or phrases that may be identified (604) as suggestive of a particular activity might include "lunch", "coffee", "dinner", "swim", "bike ride", "run", or others. Words or phrases that may be identified (604) as suggestive of a location might include "visit you", "visit me", "next time you are in town", "next time I am in town", or others. To the extent that such details cannot be identified (604) with some confidence, the system may respond and prompt the parties for additional information (e.g., "Did I understand that you want to meet for lunch next week in Cincinnati? (reply yes, or reply with a time frame, activity, or location you'd like to change to))".

In order to identify potential times for the desired get together, the system may check (606) the actual schedules of one or more identified (602) users (e.g., the "bottom up" availability), check (608) the scheduling preferences for the identified (602) users (e.g., the "top down" scheduling preferences"), and may also check (610) general scheduling preferences and configurations for the users, as user specific settings may influence the proposed list of times (e.g., a particular user account may be configured to only allow automated scheduling to be proposed at times falling within the next seven days, while others users may only allow automated scheduling to be proposed at times falling outside of the next seven days). As another example, where a particular activity cannot be identified (604) as related to the get together, a user's general preferences may be used to suggest one or more activities as options for the get together.

Based on the determined information, the system may then generate a list of potential candidates for meeting, where each candidate on the list includes a time and day, and may additionally include an activity, a location, a duration, or other characteristics of the get together. Determination of the duration of a proposed get together may be based on an identified (604) activity or an activity automatically proposed based on various configured user preferences (608, 610). As an example, where the identified (604) activity is golf, the system may be configured to search for a four-hour long block of availability when proposing meeting times. Each potential get together time may be scored based upon factors such as compliance with user scheduling preferences (608), general user preferences (610), sufficient duration for activity, and other factors.

Table 1 below provides an example of five ranked potential times for a particular interaction, such as that shown in FIG. 2B. Option 1 may be highest ranked because the duration is a good match for the activity, and it complies with all scheduling preferences. Option 2 is also ranked highly because the duration is a good match for the activity, but one participant may have a preference for meeting at lunch rather than dinner, and so it is below Option 1. Option 3 may be scored lower than Option 2 because the activity is lunch, but the available time is 14:00 which may be later than preferred for one participant. Option 4 is scored below the others because it only allows 30 minutes for lunch, while Option 5 is scored last because it only allows 60 minutes for dinner, and the proposed location is Columbus, which may not be ideal for one participant that commutes to Columbus for work, but typically leaves the city before dinner time.

TABLE 1

| Exemplary list of potential meeting times | | | | |
| --- | --- | --- | --- | --- |
| Rank | Time | Activity | Location | Duration |
| 1 | June 9, 13:00 | Lunch | Cincinnati | 60 minutes |
| 2 | June 9, 19:00 | Dinner | Cincinnati | 90 minutes |
| 3 | June 12, 14:00 | Lunch | Columbus | 60 minutes |
| 4 | June 14, 13:00 | Lunch | Cincinnati | 30 minutes |
| 5 | June 20, 19:00 | Dinner | Columbus | 60 minutes |

Once the list is generated (612), the system may begin to propose meeting times to the communication thread (e.g., such as illustrated in FIG. 2B), in the general order that they are scored or otherwise ranked. As additional messages are received after a proposal, the system will continue to analyze (500) the messages to determine if they are confirmation, refusals, or other requests related to the list (e.g., "focus on lunch", "focus on Cincinnati", "let's wait till July"). Where a sufficient number of acceptances are received (616), the system may confirm (618) the meeting with the responding attendees, which may include providing a response to the communication thread (e.g., such as illustrated in FIG. 2D). Sufficiency of acceptance may vary by implementation, may vary by the configured preferences of one or more participants, or may vary based upon state-specific preferences for a particular thread or get together request (e.g., a user may configure a specific get together request to require acceptance by all participants). In some implementations, the system will consider two or more acceptances as sufficient, thought additional messages from participants containing wake words or phrases may modify this behavior (e.g., a user my refuse the proposed meeting and request additional meeting times, a user that already accepted the meeting may request additional meeting times in response to another user refusing the meeting). Where there is insufficient acceptance (616) for any reason, the system will propose (614) the next best meeting time from the list until sufficient acceptance is reached (616) or all options are exhausted.

After confirming (618) the meeting with all accepting attendees, the system may update (620) one or more third party availability services to reflect the confirmed get together, which may include sending information to the third party availability interfaces (106) to add a description of the get together to the applicable time periods. The system may also configure one or more future times where the system will automatically suggest a meeting between the accepting users and any users that did not accept (622), so that any user refusing the get together invitation will have future opportunities to meet with the other participants.

Figure 8:
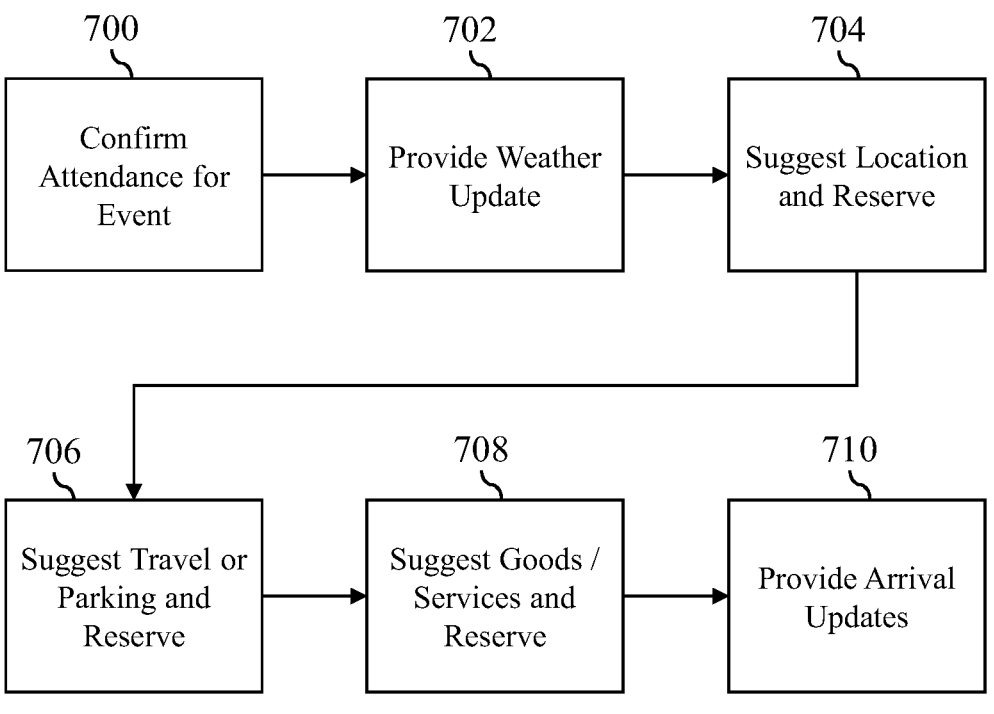
FIG. 8 is a flowchart of an exemplary set of steps that could be performed with the system of FIG. 1 to coordinate execution of a scheduled event.

As further example of configurations and steps performed with the system, FIG. 8 is a flowchart of an exemplary set of steps that could be performed with the system to coordinate execution of a scheduled event. In addition to providing ongoing reminders (208), the system may automatically provide, or may provide in response to wake words, additional goods, services, or information updates related to the scheduled get together. As one example, this may include a response to the communication thread requesting that each attendee confirm (700) their attendance just before the event by responding to the assistant in the affirmative. As another example, the system may provide (702) weather updates to the communication thread via the assistant, which may include warning the participants about rain, snow, or other inclement weather. As another example, the system may suggest (704) a location for an activity of the get together to the extent not already selected by the attendees, and may allow the attendees to reserve or request a reservation at the location (e.g., such as illustrated in FIGS. 2F and 2G) by communicating with the location via the third party service interface (108).

As another example, the system may suggest (706) additional information or reservation opportunities related to travel or parking, such as identifying a parking structure near the get together location and allowing the user to reserve a spot or pre-pay for parking based upon a wake word response to the suggestion, or doing the same for a rideshare service (e.g., such as illustrated in FIG. 2G). As another example, the system may suggest (708) goods or services available at the facility that may be requested so that they are prepared upon arrival at the get together (e.g., such as illustrated in FIG. 2H). As another example, the system may provide (710) ongoing arrival updates to all attendees (e.g., such as illustrated in FIG. 2H). Ongoing arrival updates may be based upon real-time location information provided by a user device of the applicable user, and may be provided automatically or in response to a request by one of the participants sent to the communication thread (e.g., an SMS message from a user requesting "how close is everyone to the restaurant?").

In some implementations, the system may also allow users to interact with the scheduling server (100) itself, as well as with other accounts or platforms they have linked to the system (e.g., the third party availability services (106)) via communication with the assistant via a communication thread or channel (e.g., such as the SMS interactions between CD and SP illustrated in FIG. 2C). As an example, a user may modify various user information or user configurations (e.g., such as those provided during registration (200)) by communicating directly with the assistant using wake words, such as "don't suggest any get together at Taco Shack anymore." In this example, the system may update the user's preferences for future meetings to exclude that location. As another example, the user may make change to their third party availability services by communicating with the assistant using wake words, such as "set a reminder to pick up my prescription on Friday at noon." In this example, the system may update any third party availability services for the user via the availability interfaces (106), causing those calendar services or task lists to reflect the event "pick up my prescription" on the next Friday at 12:00.

Figure 10:
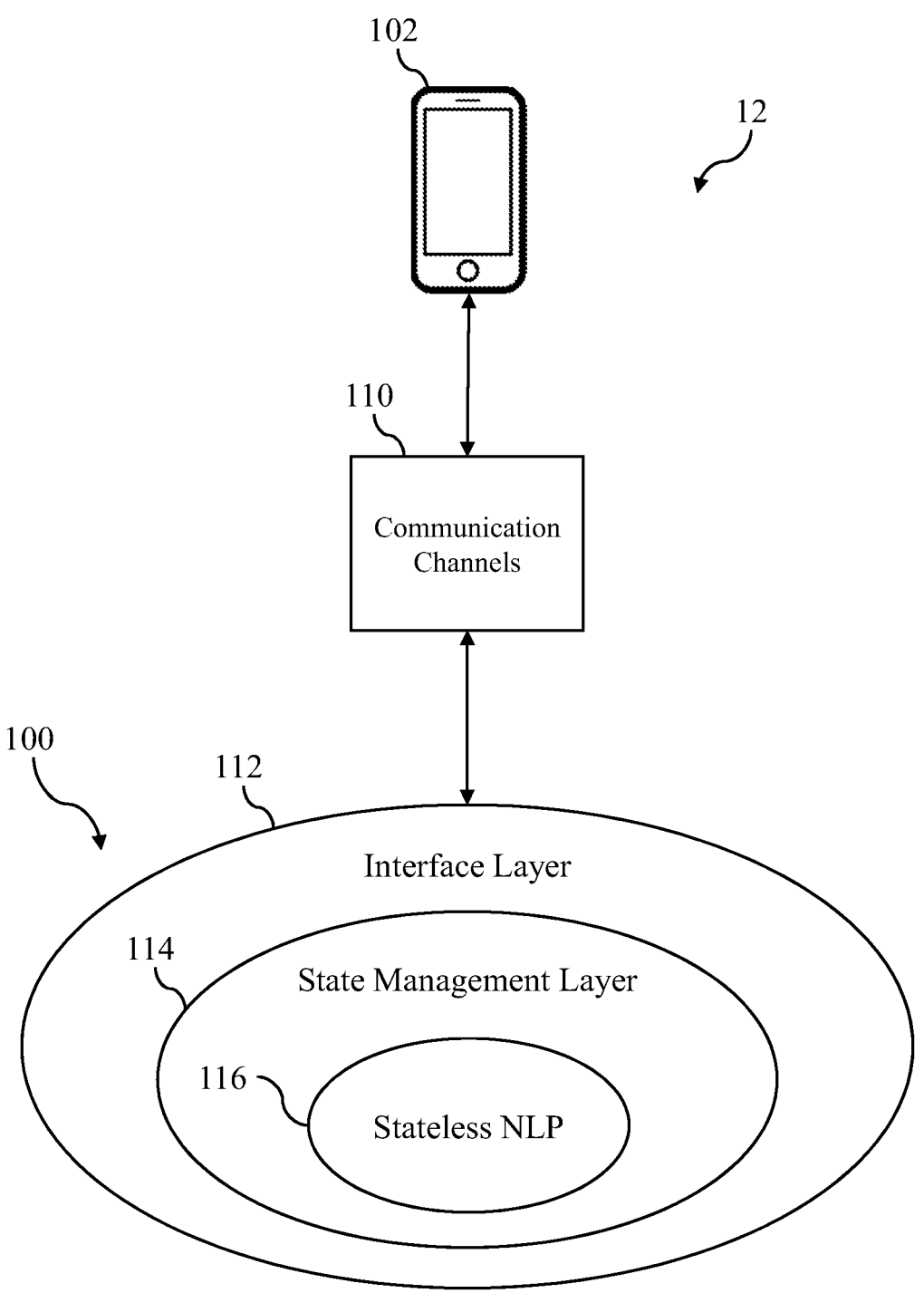
FIG. 10 is a schematic diagram of an exemplary layered architecture usable with the system of FIG. 1.

With reference to FIG. 10, some implementations of the system (10) may be configured to implement a layered architecture (12) for handling communications and interactions of the server (100) with a user device (102) via one or more communication channels (110), such as may occur during some or all of the steps illustrated in FIG. 3 and described herein. In particular, the architecture (12) provides an efficient and flexible approach for receiving messages from users related to scheduling and coordination of a get together, determining characteristics of those messages, classifying those messages, performing natural language processing or other semantic analysis of those messages, and other activities, as will be described in more detail below.

As illustrated in FIG. 10, the server (100) may be configured with a three-layer architecture that includes an interface layer (112), a state management layer (114), and a stateless natural language processing ("NLP") or other text analysis layer (116). The interface layer (112) may include a set of channel specific modules that each correspond to one of the communication channels (110), and each module may be configured to monitor, scan, retrieve, and/or receive messages from that corresponding channel (e.g., one module may be configured specifically for messages received via SMS communications, while another module may be configured specifically for messages received via a particular chat messaging platform). Each module may be configured to, for example, monitor and extract or receive new messages from a channel, to format incoming and outgoing messages for a channel, and to identify characteristics of the channel and/or message (e.g., such as the number of participants in the channel, the date and time of the new message, a unique channel name, group name, or other description associated with the channel, etc.). By separating the channel specific interface layer (112) configurations from other layers of the architecture (12), the addition of new channels to the supported communication channels (110), or adaption to external changes to the supported communication channels (110), can be efficiently performed and confined to the interface layer (112) by, for example, adding new modules, or updating existing modules.

The state management layer (114) is configured to receive input from the interface layer (112), associate an incoming message with a particular user group, determine and track a state for that group (e.g., including, for example, identification of participants, channel, as well as state information specific to coordination of a get together, such as tracking whether the system has proposed a meeting time, or is waiting for a particular user to confirm a meeting time, or other states within a sequence such as those illustrated in FIGS. 3-8), and provide other characteristics and contextual inputs to the stateless NLP layer (116). The state management layer (114) may also be configured to perform or assign classifications for messages based on the determined characteristics and context, which may also be provided to the NLP layer (116). As an example, the state management layer (114) may be configured to determine, based upon a particular communication channel by which a message was received, a classification of the message style. Classifications of message style may vary, but as an example may include a "formal message" style and an "informal message style". As further example, where a particular communication channel is generally used for business or professional purposes by all users, or a particular group of users, messages arriving via that channel may be classified as formal messages.

The stateless NLP layer (116) may include one or more natural language processing features or methods, and may include a plurality of specialized models for processing and analyzing messages based on the context, characteristics, and other inputs from the statement management layer (114). As an example, where the stateless NLP layer (116) receives as input a message text and one or more classification associated with the message text, the NLP layer (116) may be configured to select one or more corresponding analytic models or features for processing of that message. Continuing the above example where a message is classified as a formal message, the NLP layer (116) may select a NLP model that is configured specifically for analysis of messages in a formal or professional setting (e.g., underlying model training data, annotation, metadata, or other data used by the model may be based upon examples and annotation specific to messages representative of formal or professional communications).

In this manner, message meaning can always be determined by the system based upon the narrowest, best, or most applicable available model based on the message classification and/or other characteristics and context. This allows the system to quickly and accurately derive meaning from incoming messages, as compared to a conventionally expansive approach to NLP that might utilize a generalized model based on a massive underlying dataset, which will be both slower to provide results and will provide less accurate results (e.g., since a generalized model does not account for message style or setting, informal language such as "LOL" or "omw" may be misinterpreted and not recognized as informal communications with high confidence). Performance of the stateless NLP (116) is also improved because it is configured to perform NLP in a stateless manner, based only on the inputs and context provided by the state management layer (114), meaning that each request to the NLP function can be narrowly scoped as compared to a conventional/expansive approach that favors consideration of all available or accessible past and current data.

As has been described, the advantages of the layered architecture (12) include at least improved performance and speed comparable to generalized approaches (e.g., due to use of channel specific modules by the interface layer (112), use of classification/context/characteristic specific models by the stateless NLP (116), narrow scoping of input and stateless nature of stateless NLP (116)), as well as greatly improved efficiency in updating and managing the system over time. As an example, channel modules, classification models, conversation states, and other layer specific characteristics can be created or modified over time without impacting other portions of the systems, such that adding a new communication channel module to the interface layer (112) does not require any changes, or any substantial changes, to the state management layer (114) or stateless NLP (116).

Figure 11:
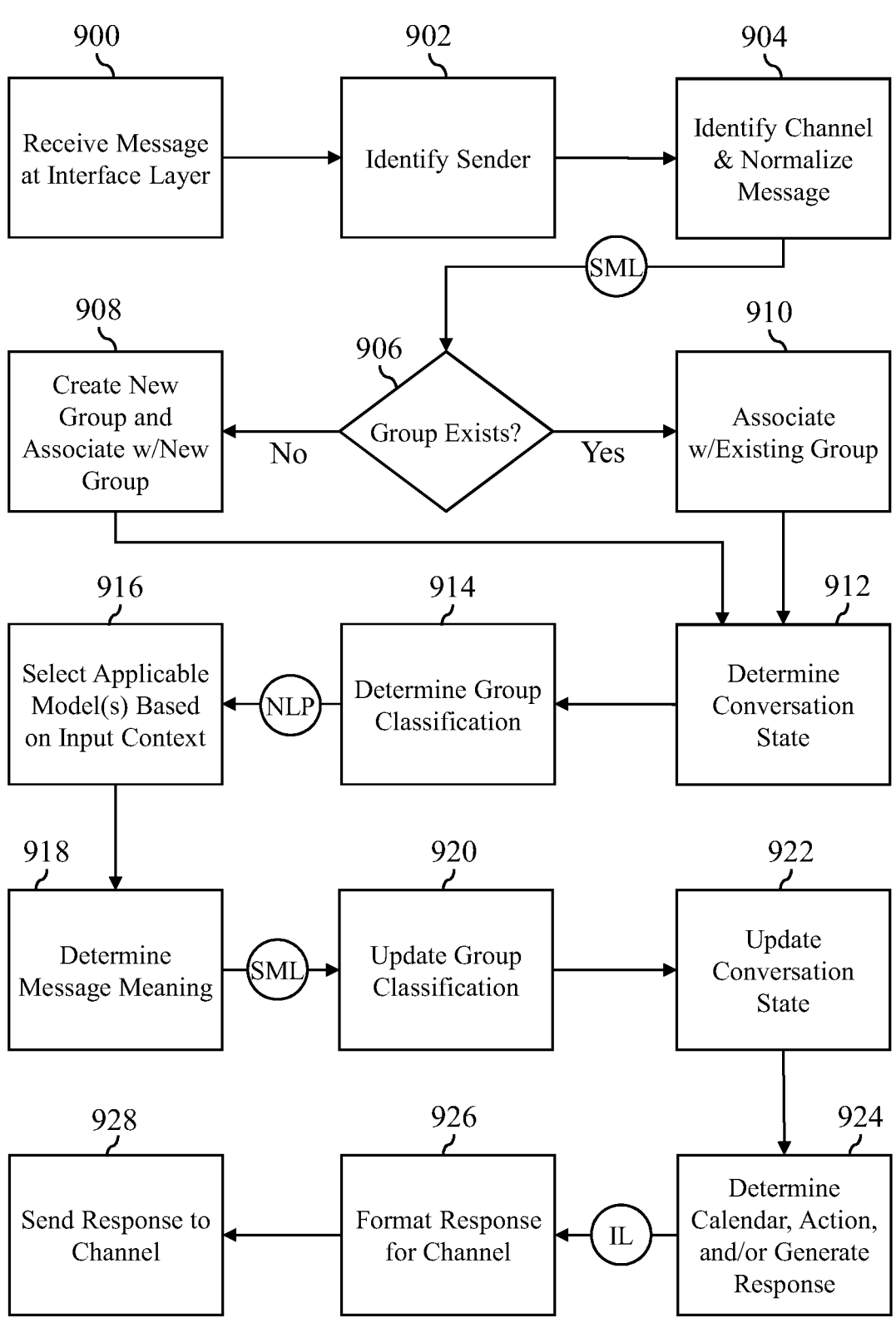
FIG. 11 is a flowchart of an exemplary set of steps that could be performed with the system of FIG. 1 to receive and process messages from users.

FIG. 11 provides additional examples of steps that could be performed with a system such as that described in FIGS. 1 and 10. In implementations of the system that include the architecture of FIG. 10, control, inputs, and/or outputs may advantageously be passed between layers at times, and several such examples are illustrated in FIG. 11 as circular nodes positioned along a flow arrow and appropriately labeled (e.g., "SML" for state management layer, "NLP" for stateless NLP layer, and "IL" for interface layer).

When a message is received (900) at the interface layer (112) from a communication channel (e.g., SMS, messaging platform, chat platform, electronic mail address, etc.), the system may identify (902) the sender from whom the message was received, may identify (904) the channel via which the message arrived, and may normalize the message based upon the identified (904) channel or other characteristics. The identified (904) channel may be self-apparent, based upon receipt of the message by a particular channel module that is configured to monitor, extract, or otherwise receive messages from a particular channel. As an example, one channel module may be configured to receive SMS messages sent to a phone number used by the system to coordinate a get together via SMS. As another example, one channel module may be configured to monitor activity within a group chat session on a third party social media platform or work productivity platform, and may be configured to extract new messages appearing in that group chat session.

Normalization performed based upon the identified (904) channel may include text formatting and other modifications performed on received message text, and may be specifically configured for each channel module. As an example, a channel module for a work productivity messaging and chat platform may be configured to normalize received message text by removing web links, file links, or other technical and/or procedurally generated links or information (e.g., message timestamps, dates, etc.), and may be configured to remove non-text characters such as emojis or other symbol combinations, or may be configured to convert emojis or symbol combination into plaintext (e.g., a thumbs up emoji may be converted into a plaintext placeholder such as "emoji thumbs up", "thumps up", "yes", "I agree", or other substitute text configured for that module). As another example, a channel module for SMS messaging may be configured to normalize received message text in similar or different ways (e.g., conversion of emojis or symbols may be performed with different substitute text on different channels, such as a fireworks emoji being converted to "great job" in a professional channel, and being converted to "let's party" in a social channel).

Message text may then be provided to the state management layer (114), along with other characteristics such as the identifier sender, identified channel, other participants/recipients of the message within that channel (e.g., such as identification of other participants in a SMS group chat, or web based group chat session), a time and date associated with the message's transmission, and other information.

At the state management layer (114), the system may use the received characteristics to determine whether an identified group already exists (906) in association with the message. A group may include two or more users of the system that have invoked the system's features by adding a system assistant into a communication channel session for those users. When the assistant is invoked, the system may assign a unique identifier with that communication channel session, such that future communications may be associated with that session. Groups may be distinctly identified based upon the combination of initial and/or subsequently joining users, and may also be distinct for the same users when occurring on different communication channels. As an example, the system may distinctly identify a first group that includes only the users AB and CD conversing via SMS, and may distinct identify a second group that includes only the users AB and CD conversing via group chat or direct messaging via a work productivity platform. In some implementations, additional users subsequently added to a group after it has been assigned a unique identifier will not cause the group identity to be modified or updated, and in such instances it may be helpful to think of the identifier as instead being a thread identifier or session identifier.

Where the system determines that the message is arrived from an existing (906) group, the system may associate the message with the existing group, thread, or session identifier. Where the message arrived from a new group (906), such as where a user initially invokes the system within a communication channel session by adding, inviting, or otherwise including the system in the session, the system may create (908) a new group by assigning a unique identifier to that group, associating the message text with that new group, storing characteristics/metadata associated with that group, and setting an initial state for that group.

As messages arrive and are associated (908, 910) with groups, the system may determine (912) and maintain a conversation state for each group. The state management layer (914) may be configured to identify certain discrete states that have particular relevance to the coordination features of the system, such as illustrated in FIGS. 2A-2H, the subsequent flowcharts, and the related discussion. Table 1 below provides several examples of states that may be defined in some implementations of the system. It should be understood that the exemplary states provided are for example only, and that particular implementations may include more or less states, and may include sub-states organized into tree-style patterns or other collections that dictate the logical flow between states based upon user responses and/or external occurrences. A determination of the conversation state may be useful in determining which actions, options, features, or other activities are currently available to users, and may also be useful in determining the meaning of a particular message text from a user, as will be described in more detail below.

TABLE 1

Exemplary conversation states recognized
by state management layer

| State | Description |
|---|---|
| Waiting | Assistant has been added to session, but no coordination features have been invoked. |
| Proposed | Assistant has proposed a get together and is awaiting responses from users. |
| Counter-Proposed | A user has counter-proposed a different time and date for proposed get together. |
| Confirmed | Get together has been confirmed and scheduled for responding users. |
| Imminent | Get together is scheduled to occur within next 24 hours. |
| Cancelation | A user has indicated they can no longer attend a scheduled get together. |
| Location | Users are discussing a location for the get together. |
| Activity | Users are discussing an activity associated with the get together. |
| Current | Currently within time and date for scheduled get together. |

The system may also determine (914) one or more classifications for the applicable group, conversation, thread, or session, as has been described above. Classifications associated with a particular group may be maintained and modified over time (e.g., group classifications may be assigned to, or removed from a group) based upon the group's activities, user configurations of particular users within the group, activities of other groups and users, and in other scenarios. As has been discussed, group classifications may be useful as additional context when performing NLP functions or other analyses of group message text and other activity.

The state management layer (114) may query the NLP layer (116), and may providing varying inputs such as the message text, group classifications, conversation state, sender identity, group participant identity, channel identity, and other characteristics or context that may be useful in more narrowly scoping analysis of the message text. At the NLP layer (116), the system may select one or more applicable language analysis models based on the provided inputs, and may determine (918) the meaning of the message text using the selected (916) model(s). Language analysis functions and models may vary by implementation, and may include, for example, some or all of pre-configured expert modules, artificial intelligence modules (e.g., machine learning, deep learning), and other analysis modules.

In some implementations, such as those that include machine learning or deep learning, a plurality of purpose specific models and corresponding training datasets may be configured and selectively applied to message text based upon the provided inputs. As an example, this may include purpose specific models that apply based upon the conversation state (e.g., with reference to Table 1, a "waiting" model, a "proposed" model, a "counter-proposed" model), based upon the identified sender (e.g., a user specific model), based upon group classifications (e.g., a professional conversation model, a family conversation model, a friends conversation model), based upon specific channels (e.g., an SMS model, a first third-party messaging platform model, a second third-party messaging platform model), and based on other factors. In some implementations, models may include hybrid models (e.g., a combination of a state specific model, and a classification specific model) built from combined training datasets. In some implementations, multiple models may be applied, with the results of such model analyses being weighted and/or combined (e.g., a separate weighted analyses by each of a state specific model and a classification specific model, where the output of the state specific model is more heavily weighted).

After determining (918) the message meaning based on the selected model(s), the output of which may include, for example, one or more determined meanings, probabilities or confidence ratings for possible meanings, related topics, related sentiment, or other output of language analysis, the system may provide that output to the state management layer (114) to act upon. At the state management layer (114), the system may update (920) classifications associated with the group, thread, or session, which may include reclassifying the group based upon gradual analysis of their conversation over time (e.g., a group may initially be classified as "formal" based upon communication channel and/or formality of message text, but may be reclassified as "friendly" after a period of time in which their messages became less formal, such as might occur when co-workers initially meet and then gradually become friends). The system may also update (922) the conversation state for the group to reflect that the message text was relevant to the current conversation state in some way (e.g., with reference to Table 1, the conversation state may be updated from "waiting" to "proposed" where the message text was determined to be a request to get together).

The system may also take certain actions (924) based upon the conversation state and message meaning, such as generating and sending response messages, identifying potential get together times for users, determining which user calendars or availability configurations to select from, canceling or updating a scheduled get together, or other actions such as those illustrated in FIGS. 2A through 2H, and described in relation to those figures as well as the steps of FIGS. 3 through 8. A determination (924) of actions to be performed by the system in response to the message may be based upon the analytical output of the NLP layer (116), and may also consider additional state specific rules, configurations, or considerations. For example, output from the NLP layer (116) may indicate with a highest confidence that a received text message is requesting that a scheduled meeting be canceled, but the current conversation state may indicate that no meeting is currently scheduled, so the system may instead use the meaning associated with the next highest confidence, which may be a request to exit the group or no longer receive communications from the system.

In generating (924) responses, the system may select from certain pre-configured response templates that are dependent upon the prior and updated conversation states (912, 922), and may complete those response templates using variable information determined by queries of user calendars, preferences, or other configurations, for example. Generated (924) responses may be provided to the interface layer (112), which may format (926) the response for transmission or presentation via the corresponding channel module from which the message prompting the response was received. This may include, for example, formatting the generated (924) response so that it is compatible with a certain channel (e.g., shortening a response by abbreviation for transmission via SMS), formatting the response with header or other information for transmission via electronic mail, formatting the response to include clickable links or other interactive controls that may be presented via a group chat sessions or web-based interface, or other changes. The system may then send (928) the formatted (926) response to the group via the applicable communication channel.

Figure 12:
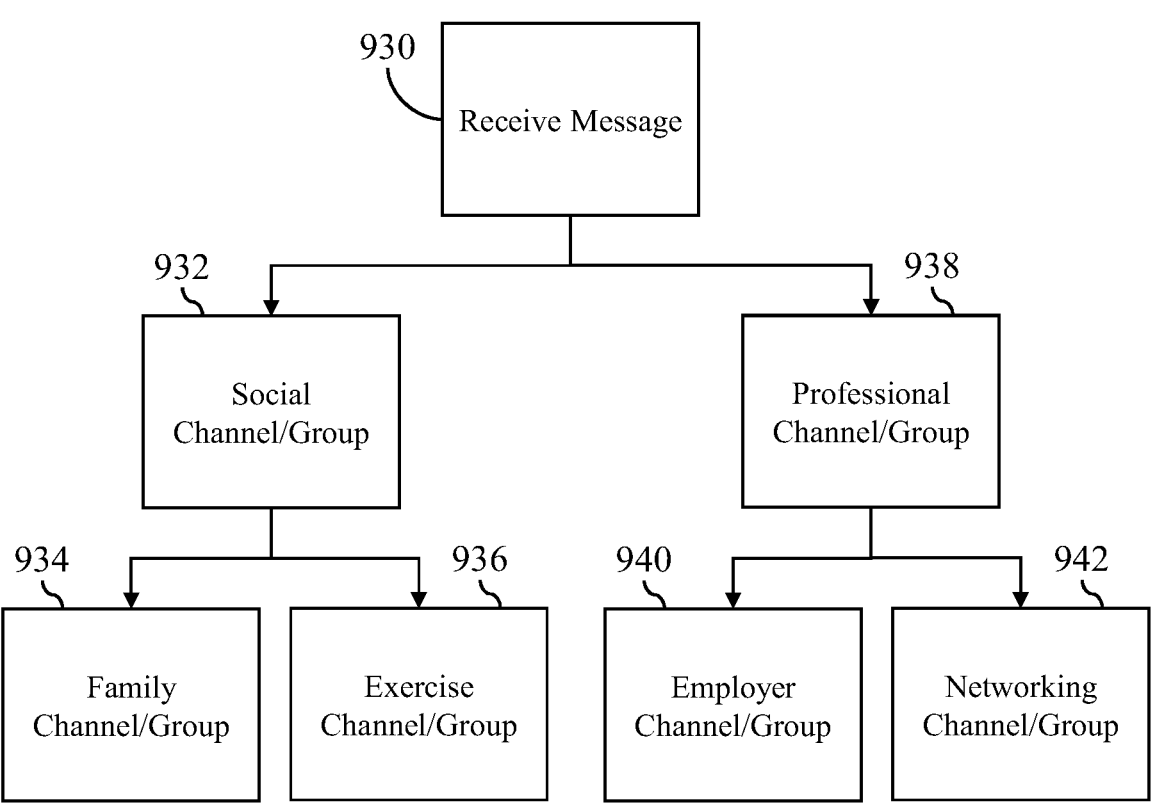
FIG. 12 is a schematic diagram illustrating exemplary channel and context based classifications and sub-classifications.

FIG. 12 illustrates a further example of potential classification of groups, threads, or sessions for purposes of analytical model selection, and for user configured purposes such as the selection of different calendars or availability preferences. With reference to FIG. 9, users of the system may be able to configure separate availability lists and/or separate calendars that are considered or used in different contexts. As an example, a user may create a top-down availability such as that shown in FIG. 9 that is configured for professional activities, and may create a separate availability that is configured for social activities. With reference to FIG. 12, when a message is received (930) and analyzed such as is described in FIG. 11 and elsewhere, the system may determine that the message arrived via a communication channel used for social activities, or is from a group associated with social activities (932), and may select analytics models, and user calendar and availability information, based on that social activity association. The social activity (932) association may have additional sub-associations that are narrower and/or more relevant to the particular channel and/or group—such as a family specific (934) association for social activities, and an exercise specific (936) association for social activities.

These associations may occur before and/or after language analyses, the results of which may influence the associations and allow for multi-threaded conversations within the same group, thread, or session. As an example, a particular user may configure their account to identify all SMS communication as "social", and may also configure their account to indicate an interest in exercise. A message arriving from another user via SMS may be received by the system and initially classified as "social" because of the arrival channel. Subsequent language analyses may indicate with high confidence that the message relates to exercise, and so the system may update conversation state and take additional actions within that context, instead of a different or more general context. As an example, the system may be in the process of coordinating a lunch with the group members when one group members sends the message related to exercise. After language analysis, the system may create a new parallel conversation state related to scheduling a group exercise activity, while maintaining the pre-existing conversation state related to scheduling a lunch activity unchanging.

Continuing the example above, the user may have a first availability associated with all social activities (932) and a second availability associated with all professional (938) activities. In this manner, when the system checks the user's calendar and/or availability for a get together, the system may selectively choose the applicable calendar and availability based on a channel and/or group classification as illustrated in FIG. 12, and has no need to prompt the user for which calendar or availability should be used in response to a particular get together request.

Figure 13:
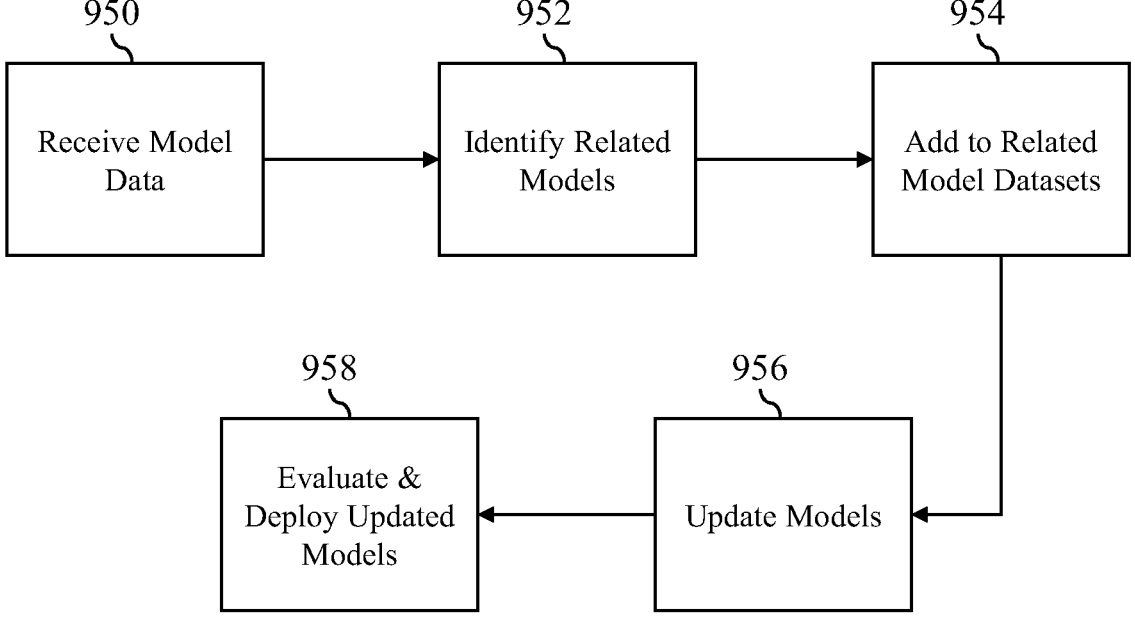
FIG. 13 is a flowchart of an exemplary set of steps that could be performed with the system of FIG. 1 to share training datasets and configurations between related analytical models.

FIG. 13 shows a set of steps that may be performed by the system to provide cross-training of related language analysis models based upon shared training datasets or other shared analytical configurations. This may include sharing training datasets, sharing configurations, or sharing analytical insights from a broad model (e.g., "social activities") to a narrower model (e.g., "social activities: exercise"), or the opposite. This may be accomplished via a hybrid-model or weighted-result analysis as described above, and may also include aspects of FIG. 13. When the system receives (950) model data, which may include receives message text, results of NLP functions, user feedback, manual annotation and/or curation, or other sources of training data, the system may identify (952) one or more models related to the data. This may include models that are separately related (e.g., the data may be applicable to both the social (932) category and professional category (938)), or may include models that are related as sub-categories (e.g., the data may be applicable to the social (932) category and the family (934) sub-category).

The system may add (954) the new model data to the training datasets or other configurations of the identified (952) related models, and based upon a schedule or manual selection may intermittently update (956) those models based on the newly available data. New and/or updated models may be evaluated (958) against evaluation datasets to determine if they are an improvement upon prior models, and may be deployed for use where they are acceptable.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. A system for automated activity coordination and scheduling comprising:
    (a) a server comprising one or more processors, wherein the server is communicatively coupled with one or more communication channels;
    (b) stored configurations for a plurality of users and, for each of the plurality of users, an availability dataset that describes that user's actual availability and preferred availability;
    wherein the one or more processors are configured to:
    (i) receive a plurality of messages sent to a communication session in which a plurality of participants are communicating via a communication channel of the one or more communication channels, wherein the plurality of participants includes at least one user of the plurality of users;
    (ii) associate an assistant with the communication session, wherein the assistant is a software process configured to monitor the communication session;
    (iii) receive an assistant request from a user device associated with the at least one user of the plurality of users, and associate the assistant with the communication session in response to and based on the assistant request;
    (iv) perform an analysis of the plurality of messages to determine a meaning for each of the plurality of messages;

(v) perform a scheduling action based on the analysis, and, in response, provide a session response to the communication session based on the scheduling action;

(vi) cause a top-down availability interface to display on the user device, wherein:

(i) the top-down availability interface comprises display of a set of days and, for each of the set of days, a set of times, and (ii) the top-down availability interface is configured to update each day-and-time pair based upon a user selection to indicate that the user is available at that day-and-time pair, not available at that day-and-time pair, or conditionally available at that day-and-time pair; and (vii) receive a set of availability selections made through the top-down availability interface from the user device, and update the user's availability dataset based on the set of availability selections.

2. The system of claim 1, wherein the one or more processors are further configured to:

(a) determine that the scheduling action is a meeting proposal based upon the meaning of the message;

(b) for the plurality of participants associated with the communication session from which the message was received, determine a shared availability based upon one or more availability datasets for the plurality of participants;

(c) create the session response as the meeting proposal based on the shared availability; and (d) update the one or more availability datasets for each of the one or more of those participants based on that participant's subsequent message in response to the session response.

3. The system of claim 1, wherein the one or more processors are further configured to:

(a) identify a scheduling request based on the analysis; and (b) identify a meeting time at which the plurality of participants are available in response to identifying the scheduling request.

4. The system of claim 1, wherein:

(a) the plurality of participants includes the at least one user that is also within the plurality of users, and at least one user that is not within the plurality of users.

5. The system of claim 1, wherein the one or more processors are further configured to:

(a) perform the analysis of the plurality of messages using a language analysis function;

(b) identify pre-configured words within the plurality of messages, and determine the meaning based on a pre-configured meaning associated with the identified pre-configured wake words; and (c) determine the meaning based on a set of training data.

6. The system of claim 1, wherein the availability dataset for each user is usable by the one or more processors to receive that user's actual availability from a third party calendar service, and wherein the one or more processors are further configured to update that user's actual availability to reflect acceptance of the proposed meeting on the third party calendar service.

7. The system of claim 1, wherein the one or more processors are further configured to provide at least one reminder to the communication session based on the scheduling action.

8. The system of claim 1, wherein the plurality of communication channels comprises:

(a) a phone number based text messaging channel; and (b) a browser based text chat channel.

9. A method comprising:

(a) storing configurations for a plurality of users and, for each of the plurality of users, an availability dataset that describes that user's actual availability and preferred availability;

(b) communicatively coupling a server with one or more communication channels;

(c) receiving a plurality of messages sent to a communication session in which a plurality of participants are communicating via a communication channel of the one or more communication channels, wherein the plurality of participants includes at least one user of the plurality of users;

(d) performing an analysis of the plurality of messages to determine a meaning for each of the plurality of messages;

(e) identifying a meeting time at which the plurality of participants are available based on one or more availability datasets for the plurality of participants, and providing a proposed meeting to the communication session based on the meeting time; and (f) providing a meeting confirmation to the communication session based on the proposed meeting;

(g) causing a top-down availability interface to display on a user device, wherein:

(i) the top-down availability interface comprises display of a set of days and, for each of the set of days, a set of times, and (ii) the top-down availability interface is configured to update each day-and-time pair based upon a user selection to indicate that the user is available at that day-and-time pair, not available at that day-and-time pair, or conditionally available at that day-and-time pair; and (j) receiving a set of availability selections made through the top-down availability interface from the user device, and updating the user's availability dataset based on the set of availability selections.

10. The method of claim 9, further comprising:

(a) associate an assistant with the communication session, wherein the assistant is a software process configured to monitor the communication session;

(b) identifying a plurality of responses to the proposed meeting based on the analysis;

(c) identifying each participant of the plurality of participants whose response within the plurality of responses indicated acceptance of the proposed meeting; and (d) for each identified participant that is also within the plurality of users, updating that participant's availability dataset to reflect acceptance of the proposed meeting.

11. The method of claim 9, further comprising:

(a) identifying a scheduling request based on the analysis; and (b) identifying the meeting time at which the plurality of participants are available in response to identifying the scheduling request.

12. The method of claim 9, wherein:

(a) the plurality of participants includes the at least one user that is also within the plurality of users, and at least one user that is not within the plurality of users.

13. The method of claim 9, further comprising:

(a) performing the analysis of the plurality of messages using a language analysis function;

(b) identify pre-configured words within the plurality of messages, and determine the meaning based on a pre-configured meaning associated with the identified pre-configured wake words; and (c) determine the meaning based on a set of training data.

14. A system for automated activity coordination and scheduling comprising:

(a) a server comprising one or more processors, wherein the server is communicatively coupled with a plurality of communication channels;

(b) stored conversation states for a plurality of communication sessions occurring on the plurality of communications channels;

wherein the one or more processors are configured to:

(i) perform an analysis of a message, using a language analysis function, received from a communication session of the plurality of communication sessions based on a conversation state of the communication session, and update the conversation state based on the analysis of the message;

(ii) perform a scheduling action based the conversation state; and (iii) provide a session response to the communication session based on the scheduling action;

(c) an interface layer comprising a plurality of channel modules, wherein each channel module corresponds to a communication channel of the plurality of communication channels, wherein the interface layer is configured to receive each message of a plurality of messages with a channel module that corresponds to the communication channel from which the message was received;

(d) a state management layer configured to classify each message based upon a set of message characteristics, and to maintain the conversation states for each of the plurality of communication sessions; and (e) a stateless natural language processing ("NLP") layer configured to select a NLP model from a plurality of NLP models based on each message classification and corresponding conversation state and, using the NLP function, perform the analyses based on the selected NLP model.

15. The system of claim 14, wherein the one or more processors are further configured to, when selecting the NLP model and performing the analysis with the stateless NLP layer:

(a) receive a classification for the message from the state management layer;

(b) search the plurality of NLP models to identify the selected NLP model based upon an association of the selected NLP model with the classification of the message and the conversation state;

(c) perform the analysis with the selected NLP model to determine a meaning for the message, wherein the meaning comprises one more predicted meanings that are each associated with a confidence score; and (d) provide the meaning as output to the state management layer.

16. The system of claim 14, wherein the one or more processors are further configured to:

(a) determine that the scheduling action is a meeting proposal based upon a meaning of the message;

(b) for a plurality of users associated with the communication session from which the message was received, determine a shared availability based upon preconfigured availability for one or more of those users;

(c) create the session response as the meeting proposal based on the shared availability; and (d) update the preconfigured availability for each of the one or more of those users based on that user's subsequent message in response to the session response.

17. The system of claim 16, further comprising a third party availability interface that is configured to selectively provide calendar information for at least one user of the plurality of users, wherein the one or more processors are further configured to:

(a) request a set of calendar information for the at least one user from the third party availability interface;

(b) receive the set of calendar information from the third party availability interface; and (c) include the set of calendar information in the preconfigured availability when determining the shared availability.

* * * * *